United States Patent
Mohanlal et al.

(10) Patent No.: US 11,107,093 B2
(45) Date of Patent: Aug. 31, 2021

(54) DISTRIBUTED NODE CLUSTER FOR ESTABLISHING A DIGITAL TOUCHPOINT ACROSS MULTIPLE DEVICES ON A DIGITAL COMMUNICATIONS NETWORK

(71) Applicant: LiveRamp, Inc., San Francisco, CA (US)

(72) Inventors: Amresh Mohanlal, Conway, AR (US); W. Dwayne Collins, Conway, AR (US); Pavan Roy Marupally, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 186 days.

(21) Appl. No.: 16/614,749

(22) PCT Filed: May 15, 2018

(86) PCT No.: PCT/US2018/032790
§ 371 (c)(1),
(2) Date: Nov. 18, 2019

(87) PCT Pub. No.: WO2018/213325
PCT Pub. Date: Nov. 22, 2018

(65) Prior Publication Data
US 2020/0104864 A1     Apr. 2, 2020

Related U.S. Application Data

(60) Provisional application No. 62/508,805, filed on May 19, 2017.

(51) Int. Cl.
*G06Q 30/02* (2012.01)
*G06F 16/901* (2019.01)
*G06F 9/54* (2006.01)

(52) U.S. Cl.
CPC .......... *G06Q 30/0201* (2013.01); *G06F 9/54* (2013.01); *G06F 16/9024* (2019.01)

(58) Field of Classification Search
CPC .... G06Q 30/0201; G06F 16/9024; G06F 9/54
(Continued)

(56) References Cited

U.S. PATENT DOCUMENTS 7,672,865 B2   3/2010   Kumar et al.
7,685,019 B2   3/2010   Collins
(Continued)

OTHER PUBLICATIONS

Rocketfuel, "How to Stop Marketing to Devices and Start Marketing to People" (Jun. 15, 2016).
(Continued)

*Primary Examiner* — Romain Jeanty

(57) ABSTRACT

A distributed node cluster architecture within a parallel computing environment provides for the association of individuals and households accessing a communications network through multiple electronic communications devices with a particular digital touchpoint or touchpoints used when communicating on the network. The cluster facilitates the determination of a touchpoint when an individual or household name is determined, or, alternatively, the determination of an individual or household when a touchpoint is received. A persistent linkage of digital touchpoints to individuals or households communicates with an entity resolution system executing at the node cluster to track data pertaining to entities, allowing the coordination of touchpoints with such individual consumers or households over time.

28 Claims, 13 Drawing Sheets

(58) Field of Classification Search
USPC .......................................................... 705/7.29
See application file for complete search history.

(56) References Cited

U.S. PATENT DOCUMENTS

| | | |
|---|---|---|
| 7,698,236 B2 | 4/2010 | Cox et al. |
| 8,000,993 B2 | 8/2011 | Harvey et al. |
| 8,768,943 B2 | 7/2014 | Puttaswamy et al. |
| 8,943,060 B2 | 1/2015 | Krishnan et al. |
| 9,152,727 B1 | 10/2015 | Balducci et al. |
| 2009/0132365 A1 | 5/2009 | Gruenhagen et al. |
| 2012/0290651 A1* | 11/2012 | Westbrooke ............. H04Q 9/00 709/204 |
| 2013/0066771 A1 | 3/2013 | Ciurea et al. |
| 2014/0032265 A1 | 1/2014 | Paprocki |
| 2016/0048698 A1* | 2/2016 | Sahu ................. G06F 16/90335 707/783 |
| 2016/0125456 A1* | 5/2016 | Wu .................... G06Q 30/0251 705/14.49 |
| 2017/0034592 A1 | 2/2017 | Ray et al. |
| 2017/0046734 A1 | 2/2017 | Chittilappilly et al. |

OTHER PUBLICATIONS

Levine, "Experian Launches PII-Matching Audience Targeting Platform to reach 85% of the US" (Apr. 28, 2016).
Winterberry Group, "The State of Consumer Data Onboarding: Identity Resolution in an Omnichannel Environment" (Nov. 2016).

* cited by examiner

| CL | HHL | FirstName | LastName | Touchpoint | URL | Type |
|---|---|---|---|---|---|---|
| 123 | 10001 | John | Doe | john.doe@yahoo.com | www.somefinancialinstitution.com | Email |
| 123 | 10001 | John | Dough | jdoe@gmail.com | www.somesurveyurl.com | Email |
| 123 | 10001 | John | Doe | jdoe@gmail.com | www.somesocialsite.com | Email |
| 123 | 10001 | John | Dough | john.doe@yahoo.com | www.someretailsite.com | Email |
| 123 | 10001 | John | Doe | mary.doe@yahoo.com | www.anothersurveyurl.com | Email |
| 123 | 10001 | John | Dough | 501-200-2000 | www.someretailsite.com | Phone |
| 123 | 10001 | John | Dough | 501-123-1234 | www.someretailsite.com | Phone |
|  |  |  |  |  |  |  |
| 135 | 10001 | Mary | Doe | mary.doe@yahoo.com | www.somefinancialinstitution.com | Email |
| 135 | 10001 | Mary | Dough | somecatchphrase@gmail.com | www.somesurveyurl.com | Email |
| 135 | 10001 | Mary | Doe | jdoe@gmil.com | www.somesocialsite.com | Email |
| 135 | 10001 | Mary | Smith | msmith@gmail.com | www.someretailsite.com | Email |
| 135 | 10001 | Mary | Doe | somecatchphrase@gmail.com | www.anothersurveyurl.com | Email |
| 135 | 10001 | Mary | Smith | 501-200-2000 | www.someretailsite.com | Phone |
| 135 | 10001 | Mary | Doe | 501-123-1212 | www.anothersurveyurl.com | Phone |
|  |  |  |  |  |  |  |
| 148 | 10002 | Rob | Smith | 501-342-5500 | www.somefinancialinstitution.com | Phone |
| 148 | 10002 | Robert | Smith | 501-342-1000 | www.somesurveyurl.com | Phone |
| 148 | 10002 | Robert | Smith | rsmith@gmail.com | www.anothersurveyurl.com | Email |
| 148 | 10002 | Robert | Smith | msmith@gmail.com | www.somesurveyurl.com | Email |
|  |  |  |  |  |  |  |
| 154 | 10002 | Elizabeth | Jones | liz.jones@gmail.com | www.somefinancialinstitution.com | Email |
| 154 | 10002 | Liz | Jones | liz.jones@gmail.com | www.somesurveyurl.com | Email |
| 154 | 10002 | Elizabeth | Jones | ljones@gmail.com | www.somesocialsite.com | Email |
| 154 | 10002 | Jones | Elizabeth | someadjective@gmail.com | www.someretailsite.com | Email |
| 154 | 10002 | Jones | Elizabeth | someadjective@gmail.com | www.anothersurveyurl.com | Email |
| 154 | 10002 | Jones | Elizabeth | 501-200-2000 | www.anothersurveyurl.com | Phone |

Fig. 1

| Touchpoint | CL | HHL | Name |
|---|---|---|---|
| john.doe@yahoo.com | 123 | 10001 | John Doe ; John Dough |
| jdoe@gmail.com | 123 \| 135 | 10001 \| 10001 | John Doe ; John Dough \| Mary Doe ; Mary Smith ; Mary Dough |
| mary.doe@yahoo.com | 123 \| 135 | 10001 \| 10001 | John Doe ; John Dough \| Mary Doe ; Mary Smith ; Mary Dough |
| 501-200-2000 | 123 \| 135 \| 154 | 10001 \| 10001 \| 10002 | John Doe ; John Dough \| Mary Doe ; Mary Smith ; Mary Dough \| Elizabeth Jones ; Liz Jones; Jones Elizabeth |
| 501-123-1234 | 123 | 10001 | John Doe ; John Dough |
| somecatchphrase@gmail.com | 135 | 10001 | Mary Doe ; Mary Smith ; Mary Dough |
| msmith@gmail.com | 135 \| 148 | 10001 \| 10002 | Mary Doe ; Mary Smith ; Mary Dough \| Rob Smith ; Robert Smith |
| 501-123-1212 | 135 | 10001 | Mary Doe ; Mary Smith ; Mary Dough |
| 501-342-1000 | 148 | 10002 | Rob Smith ; Robert Smith |
| 501-342-5500 | 148 | 10002 | Rob Smith ; Robert Smith |
| rsmith@gmail.com | 148 | 10002 | Rob Smith ; Robert Smith |
| liz.jones@gmail.com | 154 | 10002 | Elizabeth Jones ; Liz Jones; Jones Elizabeth |
| ljones@gmail.com | 154 | 10002 | Elizabeth Jones ; Liz Jones; Jones Elizabeth |
| someadjective@gmail.com | 154 | 10002 | Elizabeth Jones ; Liz Jones; Jones Elizabeth |

| URL | Temporal Signal Pattern | Prev Month Best CL |
|---|---|---|
| www.somefinancialinstitution.com ; www.someretailsite.com | 45,38,26,24,19,12 # 111000 | 123 |
| www.somesurveyurl.com ; www.somesocialsite.com \| www.somesocialsite.com | 15,18,13,24,10,8 # 110001 \| 5,8,3,4,0,0 # 101100 | 123 |
| www.anothersurveyurl.com \| www.somefinancialinstitution.com | 28,17,36,27,18,15 # 001001 \| 55,39,37,42,29,12 # 011110 | 135 |
| www.someretailsite.com \| www.someretailsite.com \| www.anothersurveyurl.com | 35,32,37,22,19,41 # 111111 \| 12,8,13,14,10,8 # 110001 \| 1,3,2,2,1,3 # 000000 | 123 |
| www.someretailsite.com | 11,13,12,12,11,13 # 111001 | 123 |
| www.somesurveyurl.com ; www.anothersurveyurl.com | 25,18,26,14,19,12 # 111010 | 135 |
| www.someretailsite.com \| www.somesurveyurl.com | 15,12,17,12,9,14 # 111111 \| 1,3,2,2,1,3 # 000000 | 135 |
| www.anothersurveyurl.com | 5,8,18,20,29,42 # 000111 | 135 |
| www.somesurveyurl.com | 55,39,37,42,29,12 # 011110 | 148 |
| www.somefinancialinstitution.com | 3,5,2,7,8,3 # 000001 | 148 |
| www.anothersurveyurl.com | 25,32,21,34,29,12 # 111110 | 148 |
| www.somefinancialinstitution.com ; www.somesurveyurl.com | 11,13,8,12,22,26 # 111110 | 154 |
| www.somesocialsite.com | 15,29,17,22,19,12 # 111110 | 154 |
| www.someretailsite.com ; www.anothersurveyurl.com | 5,2,7,2,9,4 # 000111 | 154 |

Fig. 4

| Touchpoint | CL | HHL | CL Ranking | HHL Ranking |
|---|---|---|---|---|
| john.doe@yahoo.com | 123 | 10001 | 1 | 1 |
| jdoe@gmail.com | 123 \| 135 | 10001 | 1 \| 2 | 1 |
| mary.doe@yahoo.com | 123 \| 135 | 10001 | 2 \| 1 | 1 |
| 501-200-2000 | 123 \| 135 \| 154 | 10001 \| 10002 | 1 \| 2 \| 11 | 1 \| 11 |
| 501-123-1234 | 123 | 10001 | 1 | 1 |
| somecatchphrase@gmail.com | 135 | 10001 | 1 | 1 |
| msmith@gmail.com | 135 \| 148 | 10001 \| 10002 | 1 \| 11 | 1 \| 11 |
| 501-123-1212 | 135 | 10001 | 1 | 1 |
| 501-342-1000 | 148 | 10002 | 1 | 1 |
| 501-342-5500 | 148 | 10002 | 1 | 1 |
| rsmith@gmail.com | 148 | 10002 | 1 | 1 |
| liz.jones@gmail.com | 154 | 10002 | 1 | 1 |
| ljones@gmail.com | 154 | 10002 | 1 | 1 |
| someadjective@gmail.com | 154 | 10002 | 1 | 1 |

Fig. 5

| CL | Type | Touchpoint | Name |
|---|---|---|---|
| 123 | Email | john.doe@yahoo.com \| jdoe@gmail.com \| mary.doe@yahoo.com | John Doe ; John Dough |
| 123 | Phone | 501-200-2000 \| 501-123-1234 | John Doe ; John Dough |
| 135 | Email | jdoe@gmail.com \| mary.doe@yahoo.com \| somecatchphrase@gmail.com \| msmith@gmail.com | Mary Doe ; Mary Smith ; Mary Dough |
| 135 | Phone | 501-200-2000 \| 501-123-1212 | Mary Doe ; Mary Smith ; Mary Dough |
| 154 | Phone | 501-200-2000 | Elizabeth Jones ; Liz Jones; Jones Elizabeth |
| 148 | Email | msmith@gmail.com \| rsmith@gmail.com | Rob Smith ; Robert Smith |
| 148 | Phone | 501-342-1000 \| 501-342-5500 | Rob Smith ; Robert Smith |
| 154 | Email | liz.jones@gmail.com \| ljones@gmail.com \| someadjective@gmail.com | Elizabeth Jones ; Liz Jones; Jones Elizabeth |

| URL | Temporal Signal Pattern | Prev Month Best TP |
|---|---|---|
| www.somefinancialinstitution.com ; www.someretailsite.com \| www.somesurveyurl.com ; www.somesocialsite.com \| www.anothersurveyurl.com | 45,38,26,24,19,12 # 111000 \| 15,18,13,24,10,8 # 110001 \| 8,5,6,7,8,5 # 000001 | john.doe@yahoo.com |
| www.someretailsite.com \| www.someretailsite.com | 35,32,37,22,19,41 # 111111 \| 11,13,12,12,11,13 # 111001 | 501-200-2000 |
| www.somesocialsite.com \| www.somefinancialinstitution.com \| www.somesurveyurl.com ; www.anothersurveyurl.com \| www.someretailsite.com | 5,8,3,4,0,0 # 101100 \| 55,39,37,42,29,12 # 011110 \| 25,18,26,14,19,12 # 111010 \| 15,12,17,12,9,14 # 111111 | mary.doe@yahoo.com |
| www.someretailsite.com \| www.anothersurveyurl.com | 12,8,13,14,10,8 # 110001 \| 5,8,18,20,29,42 # 000111 | 501-123-1212 |
| www.anothersurveyurl.com | 1,3,2,2,1,3 # 000000 | 501-200-2000 |
| www.somesurveyurl.com \| www.anothersurveyurl.com | 1,3,2,2,1,3 # 000000 \| 25,32,21,34,29,12 # 111110 | rsmith@gmail.com |
| www.somesurveyurl.com \| www.somefinancialinstitution.com | 55,39,37,42,29,12 # 011110 \| 3,5,2,7,8,3 # 000001 | 501-342-1000 |
| www.somefinancialinstitution.com ; www.somesurveyurl.com \| www.somesocialsite.com \| www.someretailsite.com ; www.anothersurveyurl.com | 11,13,8,12,22,26 # 111110 \| 15,29,17,22,19,12 # 111110 \| 5,2,7,2,9,4 # 000111 | ljones@gmail.com |

Fig. 8A

| HHL | Type | Touchpoint | Name |
|---|---|---|---|
| 10001 | Email | john.doe@yahoo.com \| jdoe@gmail.com \| mary.doe@yahoo.com \| somecatchphrase@gmail.com \| msmith@gmail.com | John Doe ; John Dough \| Mary Doe ; Mary Smith ; Mary Dough |
| 10001 | Phone | 501-200-2000 \| 501-123-1234 \| 501-123-1212 | John Doe ; John Dough \| Mary Doe ; Mary Smith ; Mary Dough |
| 10002 | Phone | 501-200-2000 \| 501-342-1000 \| 501-342-5500 | Rob Smith ; Robert Smith \| Elizabeth Jones ; Liz Jones; Jones Elizabeth |
| 10002 | Email | msmith@gmail.com \| rsmith@gmail.com \| liz.jones@gmail.com \| ljones@gmail.com \| someadjective@gmail.com | Rob Smith ; Robert Smith \| Elizabeth Jones ; Liz Jones; Jones Elizabeth |

| URL | Temporal Signals Created from Process | Prev Month Best TP |
|---|---|---|
| www.somefinancialinstitution.com ; www.someretailsite.com \| www.somesurveyurl.com ; www.somesocialsite.com \| www.anothersurveyurl.com ; www.somefinancialinstitution.com | 45,38,26,24,19,12 # 111000 \| 20,26,26,28,10,8 # 111101 \| 63,44,43,49,37,17 # 011111 \| 25,18,26,14,19,12 # 111010 \| 15,12,17,12,9,14 # 111111 | mary.doe@yahoo.com |
| www.someretailsite.com \| www.someretailsite.com \| www.anothersurveyurl.com | 47,40,50,36,29,49 # 111111 \| 11,13,12,12,11,13 # 111001 \| 5,8,18,20,29,42 # 000111 | 501-200-2000 |
| www.anothersurveyurl.com \| www.somesurveyurl.com \| www.somefinancialinstitution.com | 8,4,2,2,5,3 # 000100 \| 55,39,37,42,29,12 # 011110 \| 3,5,2,7,8,3 # 000001 | 501-342-1000 |
| www.somesurveyurl.com \| www.anothersurveyurl.com \| www.somefinancialinstitution.com ; www.somesurveyurl.com \| www.somesocialsite.com \| www.someretailsite.com ; www.anothersurveyurl.com | 1,3,2,2,1,3 # 000000 \| 25,32,21,34,29,12 # 111110 \| 11,13,8,12,22,26 # 111110 \| 15,29,17,22,19,12 # 111110 \| 5,2,7,2,9,4 # 000111 | rsmith@gmail.com |

Fig. 8B

| Best Touchpoint for an Individual (CL) | | |
|---|---|---|
| CL | Touchpoint | Touchpoint Ranking |
| 123 | john.doe@yahoo.com \| jdoe@gmail.com \| mary.doe@yahoo.com | 1 \| 2 \| 3 |
| 123 | 501-200-2000 \| 501-123-1234 | 1 \| 2 |
| 135 | jdoe@gmail.com \| mary.doe@yahoo.com \| somecatchphrase@gmail.com \| msmith@gmail.com | 4 \| 1 \| 2 \| 3 |
| 135 | 501-200-2000 \| 501-123-1212 | 2 \| 1 |
| 154 | 501-200-2000 | 1 |
| 148 | msmith@gmail.com \| rsmith@gmail.com | 2 \| 1 |
| 148 | 501-342-1000 \| 501-342-5500 | 1 \| 2 |
| 154 | liz.jones@gmail.com \| ljones@gmail.com \| someadjective@gmail.com | 2 \| 1 \| 3 |

| Best Touchpoint for a Household (HHL) | | |
|---|---|---|
| HHL | Touchpoint | Touchpoint Ranking |
| 10001 | john.doe@yahoo.com \| jdoe@gmail.com \| mary.doe@yahoo.com \| somecatchphrase@gmail.com \| msmith@gmail.com | 2 \| 4 \| 1 \| 3 \| 5 |
| 10001 | 501-200-2000 \| 501-123-1234 \| 501-123-1212 | 1 \| 3 \| 2 |
| 10002 | 501-200-2000 \| 501-342-1000 \| 501-342-5500 | 3 \| 1 \| 2 |
| 10002 | msmith@gmail.com \| rsmith@gmail.com \| liz.jones@gmail.com \| ljones@gmail.com \| someadjective@gmail.com | 4 \| 1 \| 3 \| 2 \| 5 |

Fig. 9

| System Storage | | | |
|---|---|---|---|
| System Input File Storage / Footprint | Size | System Hints Storage / Footprint | Size |
| | | | |
| Internal Metadata's Usage History logs for last 6 months | 10 TB | Digital Touch point contextual semi structured hints | 125 GB |
| Current Extract of EGRR | 10 TB | Intermediate temp files used between multiple joins and aggregations ( that are deleted automatically at the end of the build) | 50 GB |
| Name & Address Extract from EGRR | 2 TB | | |
| Touchpoint Associations from EGRR | 3 TB | | |
| Householding hints | 500 GB | | |
| Raw Data Source Files | 2 TB | | |
| 3 months of Output files for Feedback into the System | 250 GB | | |
| | | | |
| Total | 28 TB | | 175 GB |

Fig. 12

| Utilization of Environment | | | |
|---|---|---|---|
| Details | Storage Size | Duration Using Sequential Processing | Duration Using Parallel Processing |
| Summarize metadata logs | 5 TB | 3 hours | 45 mins |
| Condense and join metadata logs with EGRR's history | 2 TB | 2 hours | 25 mins |
| Compile EGRR's digital touchpoint history | 1 TB | 2 hours | 20 mins |
| Construct temporal signal pattern | 3 TB | 1 hour | 15 mins |
| Ingest raw data sources | 500 GB | 1 hour | 15 mins |
| Blend the above set | 4 TB | 3 hours | 1 hour |
| Compute best individual/household for touchpoint and best touchpoint for individual/household | 2 TB | 2 hours | 30 mins |
| | | | |
| Total | 17.5 TB | 14 hours | 3.5 hrs |

Fig. 13

DISTRIBUTED NODE CLUSTER FOR ESTABLISHING A DIGITAL TOUCHPOINT ACROSS MULTIPLE DEVICES ON A DIGITAL COMMUNICATIONS NETWORK

TECHNICAL FIELD

The field of the invention is digital communications, and in particular a parallel processing solution to the association and interpretation of one or more "touchpoints" with respect to identified individuals or households that use multiple electronic communications devices in a digital communications network.

BACKGROUND ART

Communications on digital networks take place not between actual persons, but rather between electronic devices that may be used by persons. It is very common today for a particular individual to use multiple electronic devices when engaging in digital communications on a digital communications network, such as the Internet. For example, a particular individual may own and use a desktop computer, a laptop computer, a digital tablet, a gaming console, a digital set-top television box, and a smartphone, all of which are connected to the Internet by means of a cellular network, a Wi-Fi network, satellite, direct cable television line or telephone line connections, or other means.

It is relatively easy to distinguish between individual electronic devices used for digital communications on a digital communications network. For example, web sites commonly use persistent "cookies" that are set on (i.e., stored at) the electronic device being used by the individual accessing the web site. These cookies are small text files that contain various sorts of information, such as identifiers for the particular electronic device. When the user directs the web browser to the same web site at a later date, the web site may read the persistent cookie and thereby recognize this particular electronic device as having visited the website previously. Likewise, third-party cookies are commonly used by web sites to allow tracking of the use of a particular electronic device across multiple websites that may be visited. Websites containing content of interest to many users may include advertisements that set a number of third-party cookies on the users' web browsers for tracking and advertising monetization purposes. Other techniques for identifying particular electronic devices on a digital communications network include "fingerprinting" of the electronic device, which may involve, for example, examination by the website of the various software and hardware configurations of the electronic device in order to create a unique profile for the device that distinguishes it from other devices on the digital communications network.

Individuals and households that engage in communications using electronic communications devices across a digital communications network use one or more of several types of touchpoints (TPs) such as a digital phone number, email address, social handle, and mobile advertisement identifier. The individual can have one or more specific (touchpoint) instances of any touchpoint type. For purposes herein, a "touchpoint" may be defined as a digital contact point that can define and expand reach to a person or household. For example, an email address, a telephone number, a social media handle, a mobile advertisement identifier (MAID), and an in-game handle are non-exclusive examples of digital touchpoints. These touchpoints are not necessarily associated with particular electronic communications devices on the digital communications network. For example, the same individual may use his or her email address to send communications over multiple electronic communications devices employed by the individual. Likewise, different individuals may use different email addresses, social media handles, etc. to communicate over the Internet using the same electronic communications device, such as multiple persons who use a family laptop computer. In another example, household guests may use their own digital touchpoints to communicate while using a gaming console, even though this digital touchpoint is associated with no one in the household where the gaming console is located. Thus, it is not possible to associate a digital touchpoint with a particular individual or even a particular household simply by knowing that a particular digital touchpoint is used on a particular electronic device to communication over a digital communications network.

Multiple touchpoint instances for each touchpoint type are commonly associated with a particular individual or household. For example, a single individual may have an email address for personal use and an email address associated with his or her employment, different social media handles used in multiple social media forums, a business landline telephone number, and a personal cellular telephone number. Likewise, some touchpoint instances may be associated with a household rather than a particular individual, such as a family email address. The identification of the "best" touchpoint instance to use in order to contact a particular individual or household interacting with a digital communications network through multiple electronic communications device may depend upon the type and context of the message to be delivered.

Distinguishing a particular household or a particular individual that is associated with a set of digital touchpoint instances, and identifying one or more "best" touchpoint instances for an individual or household, would be of great value to the various parties providing information to the individuals and households over the digital communications network. For example, advertisers may better target their Internet-based advertising to consumers who are most likely to be interested in that advertising, and thus most likely to respond, by knowing which individuals or households are associated with a particular digital touchpoint instance, or at least by knowing which digital touchpoint instances are associated with individuals or households in a particular advertising segment or which exhibit a particular buying propensity. At the same time, any system for associating individuals or households with particular digital touchpoint instances must ensure that the privacy of these individuals and households is protected, and thereby comply with various privacy laws and rules in applicable jurisdictions as well as industry best practices that have grown up in connection with the use of digital communications networks. Thus a system and method that allows for the identification of a best digital touchpoint instance for a given touchpoint type for an individual or household, while simultaneously ensuring that the privacy of individuals and households using the electronic communications devices on these digital communications network, would be highly desirable.

DISCLOSURE OF INVENTION

The invention is directed to a distributed node cluster architecture computing system that, among other things, allows for the association of individuals and households with one or more digital touchpoint instances used when communicating using electronic communications devices on a digital communications network. The invention incorporates an Entity Graph Resolution Repository (EGRR), which is a non-discoverable repository that allows for resolution of entities, where each entity consists of a set of personally identifiable information (PII) representations, attributes, and metadata. These entities are given a persisted and maintained identification link using a proprietary linking technology, such as described in U.S. Pat. Nos. 6,523,041 and 6,766,327, which are incorporated by reference herein in their entirety. For purposes of this invention, the primary entities represent "consumers," "addresses," and "households." The invention further includes an Entity Graph Resolution Engine (EGRE), which sits on top of the EGRR and is responsible for entry into the graph (match service, linking done by a match service) as well as the retrieval of the appropriate requested information.

The invention utilizes an EGRR to perform the necessary computations. In certain implementations, the invention can allow for the determination of a digital touchpoint instance when an individual or household name is given, or, alternatively, can allow for the determination of a corresponding individual or household when a digital touchpoint instance is given. This is achieved by creating a persistent linkage of digital touchpoint instances to individuals/households, and vice versa. In various implementations, the invention may be divided into four frameworks:

a. Best Touchpoint Instance for a Person: This framework identifies and associates one or a set of most active or current digital touchpoint instances to an individual. Also, this framework manages a lifecycle of the touchpoint instance associated with the person.

b. Best Touchpoint Instance for a Household: This framework identifies and associates one or a set of most active or current digital touchpoint instances to a household. Also, this framework manages a lifecycle of the touchpoint instance associated with the household.

c. Best Person for a Touchpoint Instance: This framework identifies and associates one individual or a set of individuals to a digital touchpoint instance.

d. Best Household for a Touchpoint Instance: This framework identifies and associates one household or a set of households to a digital touchpoint instance.

The EGRR contains, in addition to touchpoints, name, address, consumer links (CLs), address links (ALs), and household links (HHLs). A consumer link is a numeric, alphabetic, or alphanumeric value that represents a single point of representation of an individual that is leveraged from the EGRR. No two consumers in a consumer universe share the same CL, i.e., each CL is unique across the universe of CLs. An address link is a numeric, alphabetic, or alphanumeric value that represents a single point of representation of an address that is leveraged from the EGRR. Each AL is, like each CL, unique across the universe of ALs. A household link is a numeric, alphabetic, or alphanumeric value that represents a single point of representation of a household (i.e., a combination of single or multiple CLs at a current AL) that is leveraged from the EGRR. Each HHL is also unique across the universe of HHLs. These implementations of the invention further utilize an entity resolution system (ER), which is comprised of both the EGRR and EGRE. Multiple nodes in a node cluster architecture are used to take advantage of parallel processing opportunities to greatly increase the speed of operations within the system.

In certain implementations, the invention uses only those digital touchpoint instances where the touchpoint instance's behavior is based on asserted activities by the individual, using an electronic communications device on the digital communications network that are controlled by the individual. For example, these types of touchpoints include telephone numbers, email addresses, MAIDs, social network handles, gaming handles, and the like. The frameworks are built using source data and constructed on a history of personally identifiable information (PII) available to the ER through the EGRR as well as usage history from internal metadata. A client utilizing the system and method, according to certain implementations of the system, may submit a digital touchpoint instance and get back a person or a household link based on the client's use case. A client may also pass on personally identifiable information (PII) associated with a person or household, such as a name or address, and seek to get back the best digital touchpoint instance associated with that person or household based on the client's use case.

These and other features, objects, and advantages of the present invention will become better understood from a consideration of the following detailed description of the various embodiments and appended claims in conjunction with the drawings as described following:

BRIEF DESCRIPTION OF DRAWINGS

FIG. 1 is a table of exemplary data from an Entity Graph Resolution Repository (EGRR) according to an implementation of the invention.

FIG. 4 is a table of exemplary data from the implementation of the aggregation of the input data depicted in FIG. 3.

FIG. 5 is a table of the output from the decisioning sub-system (block 22 of FIG. 2) using exemplary data from the table of FIG. 4.

FIG. 8A is a table of exemplary data from the implementation of the aggregation of the input data depicted in FIG. 7 for consumer links.

FIG. 8B is a table of exemplary data from the implementation of the aggregation of the input data depicted in FIG. 7 for household links.

FIG. 9 is a table of the output from the decisioning sub-system (block 42 of FIG. 6) using exemplary data from the table of FIG. 8.

FIG. 12 is a table illustrating system storage improvements utilizing an implementation of the invention.

FIG. 13 is a table illustrating processing time improvements utilizing an implementation of the invention.

BEST MODE FOR CARRYING OUT THE INVENTION

Before the present invention is described in further detail, it should be understood that the invention is not limited to the particular embodiments and implementations described, and that the terms used in describing the particular embodiments and implementations are for the purpose of describing those particular embodiments and implementations only, and are not intended to be limiting, since the scope of the present invention will be limited only by the claims. In particular, although this description uses the notion of a traditional household, every claim concerning household is equally valid for any notion of a set of individuals defined by some local commonality, including extended families, business partners, and the like.

Figure 2:
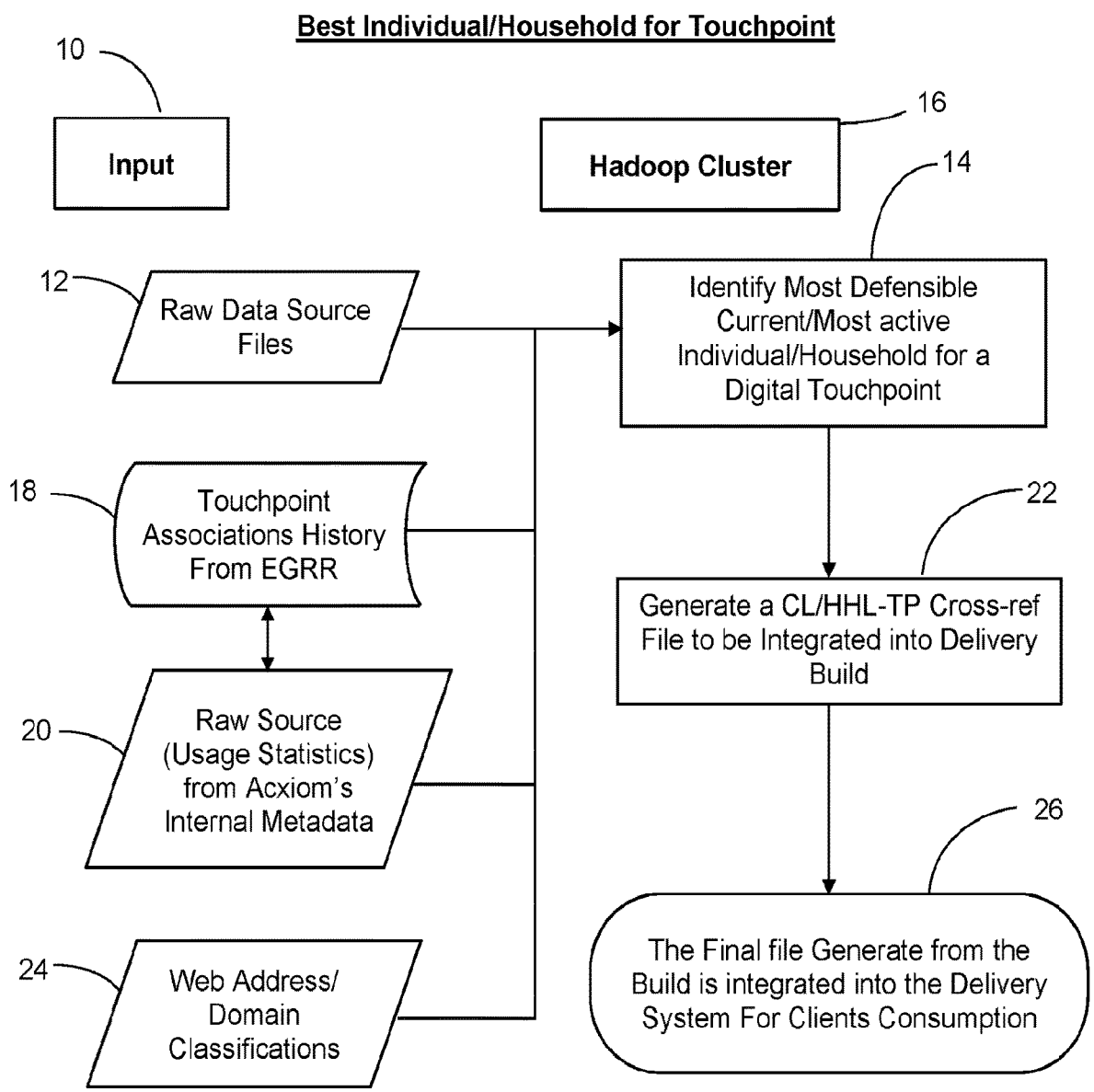
FIG. 2 is a high-level flowchart for an implementation of the invention for picking the best individual/household for each touchpoint instance for every touchpoint type.
Figure 3:
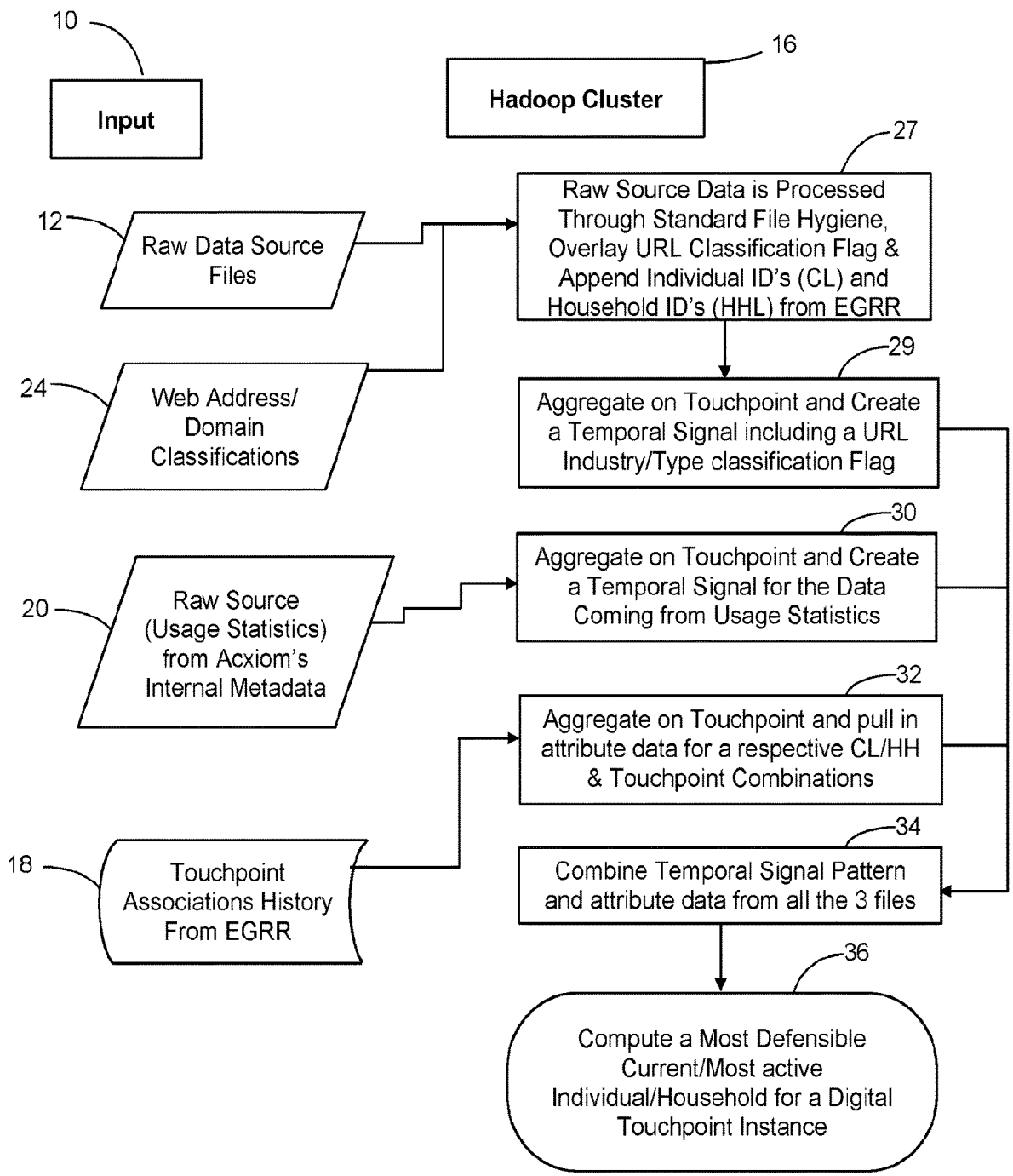
FIG. 3 is a detailed version of the first sub-system (block 14) from FIG. 2 (i.e., the decision of the choice of best individual/household).

The method for determining the best individual/household for a given touchpoint instance may be described in conjunction with the flowcharts of FIGS. 2-3, beginning with exemplary data from the EGRR as shown in tabular form in FIG. 1. The data of FIG. 1 provide examples of consumer links, household links, associated first and last names, touchpoints, associated URL, and the type of touchpoint instance. When given an instance of a touchpoint there can be several potential associations of that instance with one or more individuals and/or households. (The example here is limited to individuals, for clarity's sake, but the invention extends the same concept for households.) A "best" individual link (CL) or a household link (HHL) associated with that touchpoint instance must first have defensible evidence that in fact the association appears to be a valid one (confirmed by multiple assumed independent sources and/or appears multiple times over a temporal window of recent time). Also, the chosen "best" association must not have less defensible evidence than any other candidate association. Whenever there is not a clear best association all the "best" associations need to be compared to see if there are several that appear to have a strong locality relationship between them. Such strong locality relationships include different individuals sharing the same last name, and/or multiple common addresses and/or belonging to the same households and/or any such similar commonality attributes in the EGRR. If so, one can assume that accessing any of these candidates has a good chance of indirectly accessing the others in the set of related individuals. Hence a largest such set of related individuals increases the strength of these individuals' associations, and one can be chosen as "best" with the effect of optimizing the expected marketing impact for all the individuals in that particular group.

To analyze the temporal component in one implementation of the invention, the current month and at least the five previous months' transactional history data is collected for each identified touchpoint/individual or household association pair from a variety of appropriate sources and collected in the EGRR as longitudinal data. If desired, an implementation of this system can collect such data for up to three years or as little as three months. This data is collected from electronics communications devices communicating across the digital communications network. The sources can differ in coverage (i.e., both in number-of records and distinct reported touchpoint types). The collected data can include multiple such associated pairs that share the same individual, because many individuals have valid multiple instances of the touchpoint, as well as multiple individuals that share a common touchpoint instance, because many touchpoint instances such as email and phone numbers are shared among multiple individuals. These association pairs are first aggregated in terms of the touchpoint instances (e.g., aggregate on all distinct telephone numbers), and then sub-aggregated within each of the initially aggregated groups in terms of the individual. This process drives the construction of a temporal signal pattern constructed by taking the previously stated collected data and aggregating it per month by its timestamp and ordering the results starting with the most recent month and moving back in time. This allows both the individual/household and the touchpoint instance association to be seen historically. For example, this temporal data can indicate which individual is using that specific touchpoint the most as well as which touchpoint instance is the most used by a given individual.

Referring now to FIGS. 2 and 3, the process may be described in greater detail. In particular we will discuss FIG. 2 which is a high-level overview of the system. This figure contains one component (block 14) which will be discussed in more detail in FIG. 3. Input 10 includes a set of raw data source files (block 12) for the current month containing declared current associations between individuals and touchpoint instances. These are the sources provided by third-party source contributors. Input 10 further includes historically inferred associations (block 18) between individuals (all the consumer link associations computed on EGRR) and touchpoint instances. These associations are pulled in only to bridge the gap between the historically inferred associations that are a part of EGRR but not recently contributed by the third-party source data used in this system. The internal usage metadata (block 20) is collected and computed on a monthly basis. For each individual/touchpoint instance association in the EGRR, its internal metadata forms a temporal signal pattern as described above. This aggregated data is used to infer possible changes in the behavior of the both individual/households. The domain (URL) classification (block 24) classifies a URL per its industry type. Some of the third-party data sources are compiled from online sources. The URL from where the data is collected is sent on the source file. These URL's are categorized based on its industry classification for example: www.amazon.com would be flagged as a retail URL, whereas cnn.com would be flagged as a media URL, and citi.com would be flagged as a finance URL.

The EGRE system is processed on a Hadoop distributed file system computing environment (block 16). Although Hadoop is an ideal environment for such processing because of Hadoop's particularly effective tools for operations involving very large data sets, the invention is not so limited, and other types of distributed file system computing environments may be employed in alternative implementations. This component of the system includes several sub-components. "Identifying a defensible current individual/household for a touchpoint instance" (block 14) combines the input data and aggregate the information at a touchpoint instance. This information is then used to pick the best (most active) CL/HHL for a touchpoint instance. Both the context from the data used in the decisions as well as the decisions themselves are generated. This process will be described in further detail by use of FIG. 3. The final decisions file from block 14 will be used to generate a cross reference file (block 22) with associations for a CL/HHL to a touchpoint instance in order to be integrated into the EGRR build. The results from block 22 are then integrated into the EGRE (match services) to be used as a part of delivery bundles (block 26) for client consumption.

Block 14 (i.e., the component that computes the association of most defensible and active individual/household to its respective touchpoint instance from FIG. 2) is now described in detail using FIG. 3. As was noted in the description of FIG. 2, all the processing in FIG. 3 is performed using a Hadoop computing environment or its equivalent in this implementation. The input stream (block 10) in FIG. 3 is the same as described above in FIG. 2. A set of raw data source files (block 12 as described above) will be read into the system along with the web-address/domain classification (block 24 as described above) to create a temporal signal pattern for this data. First these raw data sources are sent through the standard file hygiene system at block 27, which includes the deduping of the data (i.e., removal of duplicate listings), and standardization of the name representations, postal address representations, and digital touchpoint instances. This enhanced data is then matched by means of the EGRE to append a CL and an HHL to each record. Next the system overlays the industry flag from the web address classification file at block 29 and aggregates the data on the touchpoint instance to create a temporal pattern signal for the source data at block 29. As a part of this temporal signal pattern, each identified touchpoint/individual association within each record instance is recorded. Also recorded is the specific source identifier from the source contributing the record, the source activity date, and counts of the number of distinct sources that contributed to the data.

The usage history of each of the touchpoint instance/individual/household associations is shown at block 30 of FIG. 3. On access to a particular entity representation in the EGRR, the internal metadata includes the aggregation of access history of that particular entity representation over a long-term for a fixed time period. This aggregated data is used to infer possible changes in the behavior of the entities they represent. This method helps provide a historical view of possible associated individual/household to touchpoint instance activity and changes that cannot be simulated with current third-party source data. In particular, the inventors hereof have recognized that this broad and anonymized coverage can be leveraged to construct representative touchpoint instance associations for every consumer link in the EGRR that directly addresses all of the issues noted earlier. This aggregated metadata is used to form a temporal signal pattern which can directly identify and validate changes in PII information at a very granular level. The EGRR offers several such temporal views for each individual/household relative to their identified touchpoint associations and attribute data extending over many years. The collection and aggregation of such information is used to construct a temporal pattern signal from internal metadata shown in block 30.

As stated above all the touchpoint and individual/household associations will be considered as a potential best individual/household for a particular touchpoint instance association. The component block 32 bridges the gap between the coverage of the raw data sources, internal metadata and historical associations from the EGRR. These types of associations are collected and aggregated at a touchpoint instance level to provide a single point of view for each individual/household and touchpoint instance association. This component will contain attributes like source contribution count and last provided date from the EGRR.

The files from all the three components (block 29, 30, and 32) above are then combined to create a temporal signal pattern (using the timestamps on the data) at block 34, providing a holistic view of all of the possible individuals/households for a given touchpoint instance and its respective association attributes collected above, which is output at block 36. The resultant temporal signal file is created with all the respective data attributes for each touchpoint/individual association pair. FIG. 4 is an example in tabular form of the resultant temporal signal file (note that the table is broken into two sections for clarity, but corresponding rows in the two sections pertain to the same resultant file) that will now be used in the following example. This resultant file above is very contextually rich and is in a linearized, semi-structured format from which a best individual (CL) or household (HHL) for a given touchpoint instance can be defensibly identified at block 36 of FIG. 3. Not only is this single individual/household identified, but all instances of individuals/households that have some degree of meaningful evidence to support an association with the given touchpoint instance is ranked. This ranking is determined in terms of the strength and defensibility of the given evidence and associated context. The strength of each candidate association is measured by two dimensions, namely, the quantity of evidence and the types of context that provide the association. The quantity is measured by the number of distinct sources that provide the given association. For example, using the first touchpoint "john.doe@yahoo.com" in the table of FIG. 4, (column named "touchpoint") the single listed CL of 123 (column named "CL") is returned. If there are multiple CLs available each is included in this column but separated by a pipe. Similarly, the HHL of 10001 (column named "HHL") is returned. This touchpoint instance is also connected with two names, specifically "John Doe" and "John Dough" (column named "Name") separated by semi-colon. If there were two or more CL's associated with this touchpoint instance the names for each CL are separated by a pipe (consider the second record in the example). There are two URLs (column named "URL") for this touchpoint instance separated by a semicolon. The two temporal signals (column named "Temporal Signal Pattern") are "45,38,26,24,19,12" and "111000" (separated by a "#"). The first represents the number of times this association was accessed through the EGRR starting with the most recent month and ending with the latest month. The second represents whether or not this association was contributed by at least one data source where "1" means yes and "0" means no. This strength is also ordered from most recent month to the latest.

In terms of the ranking process, if an individual-to-touchpoint instance association is reported by multiple independent data providers found in the EGRR's internal metadata, and/or is provided via different URLs, then this information adds defensibility to the claim that the association is relevant. The larger counts of such sets of evidence greatly strengthen the trustworthiness of the association. In terms of the second dimension, namely URL classification, sometimes an individual purposely provides a touchpoint instance that will never be used by the individual (a fake or dormant touchpoint instance). These instances can often be removed from consideration by evaluating the contextual nature of the source of the association. For example, an email provided to a dating service has a greater chance of being a meaningful one for the individual than an email provided to a survey site. Similarly, touchpoint associations access recorded in the internal metadata originating from financial clients are more likely to be meaningful than ones originating from direct marketing clients who often purchase a diversity of prospecting data from a wide variety of sources. These associations are then ranked on a two-fold ranking system that uses a "Champion-Challenger" feedback loop to persist the dominant behavior of final ranking from month to month.

As a part of this two-fold ranking system, first the individuals/households associated with a touchpoint instance are categorized as strong, moderate, or weak based on the contextual aspect of the evidence. Secondly, the associations in each of these categories are then partially ranked numerically based on the quantity aspect of the evidence as well as the contextual strength noted above. For example, in FIG. 4, mary.doe@yahoo.com pulls in two CLs (CL 123 and CL 135) both in the strong category with a strong temporal signal pattern from the usage history of the metadata and data source contribution. Specifically, CL 123 reported the temporal signals 28,17,36,27,18,15 and 001001 respectively and CL 135 reported the temporal signals 55,39,37,42,29,12 and 111100 respectively. In this case of mary.doe@yahoo.com, the CL 135 and CL 123 both reported a consistent access signal from the internal metadata as well as a presence on data source contributor files for the last six months. But the system identifies CL 135 as a higher ranking one as the local part of the email (mary.doe) matched to the "Mary Doe" name of the individual associated with CL 135, the access counts were consistently higher and it was seen in the most recent four of the last six months from the source contributors. Likewise, the system identified the household 10001 as the best as both CL 123 and CL 135 belonged to the same household of 10001.

Before the final decision is made as to the best pick, as depicted in FIG. 4, previous month's best pick, i.e., the value in column "Prev Month Best CL" is compared to the identified choice. If these two values agree then the system uses that value as the final pick. If not, the evidence must be reevaluated to make sure there is enough difference to overturn a decision. In this case, if the evidence is only slightly stronger, then the previous is preserved with the expectation that if the picked one is correct its signal will grow stronger in the future and it will eventually become the best pick.

The resultant file from this component is then processed through block 22 mentioned above in FIG. 2 to create a final output file from the system. This file is a cross-reference of a touchpoint instance with a set of ranked CLs and HHL's chosen for that respective touchpoint instance as shown in FIG. 5, i.e., touchpoint instance (in column "Touchpoint) with its respective picked set of CLs (in column CL, with multiple CLs separated by a pipe) or HHLs (in column HHL, with multiple HHLs separated by a pipe). It will be seen that where a touchpoint is resolved to multiple CLs or HHLs, those CLs or HHLs are returned with a rank relative to the other CLs (in column CL Ranking; when we have multiple CLs for a touchpoint instance, each respective CL's rank is separated by a pipe) or HHLs (in column HHL Ranking; when we have multiple HHLs for a touchpoint instance, each respective HHL's rank is separated by a pipe) to which the touchpoint instance was resolved. Again, this may correspond to multiple individuals or households using the same touchpoint instance, but the ranking process allows for the determination of a "best" individual or household associated with the given touchpoint instance.

Attention may now turn to FIGS. 6-9 for the reverse process, namely the determination of a best touchpoint instance for an individual or household. Given an individual or a household of individuals, there can be multiple instances of a given touchpoint that are associated with members of the initial chosen set of individuals. A "best" touchpoint instance must first have clear and defensible evidence that the association of that instance with the initial individual(s) is valid and recent. Next, the chosen best touchpoint instance's strength of evidence must also not be less than any other candidate. This context is more complex than the one described above with reference to FIGS. 2-3. In this context an individual/household can have multiple touchpoint instances that are actively used. However, in some such cases the touchpoint instance is provided with the intention of ignoring any communication through it, examples of such being provided above.

Figure 6:
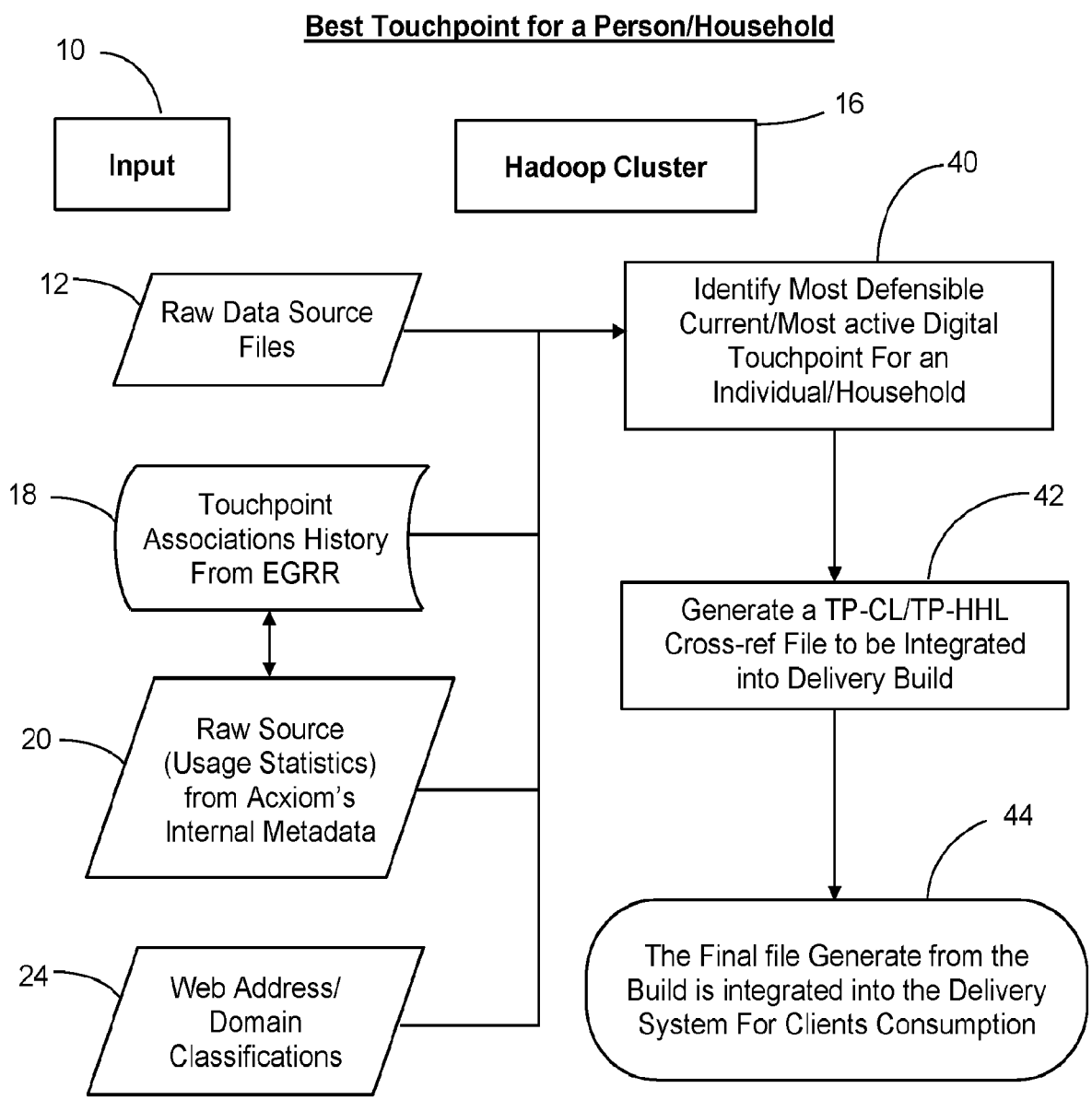
FIG. 6 is a high-level flowchart for an implementation of the invention for picking the best touchpoint instance from its available respective touchpoint instances for every touchpoint type for each individual/household.
Figure 7:
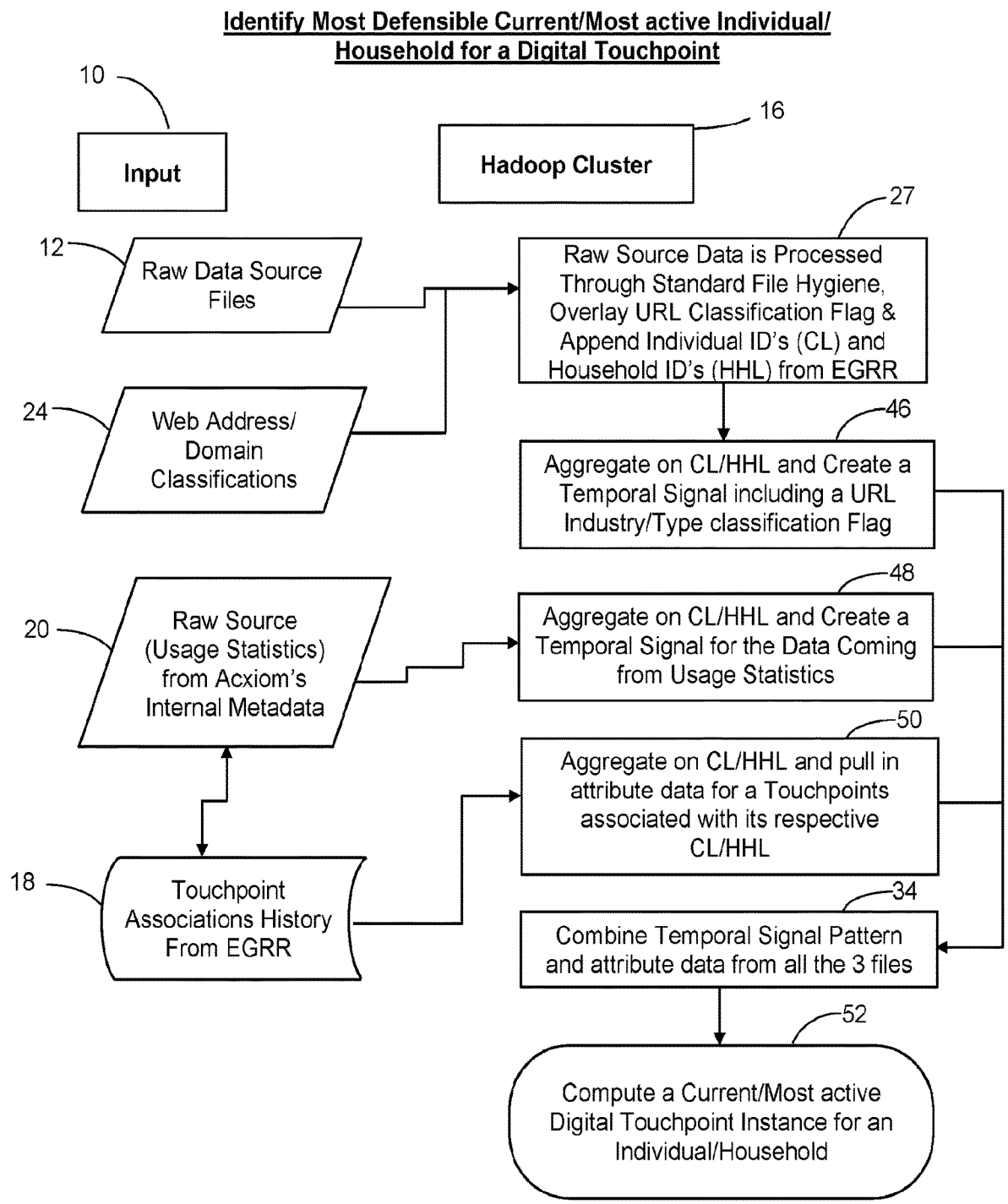
FIG. 7 is a detailed version of the first sub-system (block 40) from FIG. 6 (i.e., the decision of the choice of best touchpoint instance).

FIGS. 6 and 7 provide a view of a system that computes the best touchpoint for a CL or a HHL (corresponding to a particular individual or a particular household, respectively). In an analogous manner to the previous process FIG. 6 represents a high-level view of the system. This figure contains one component (block 40) which will be represented in more detail in FIG. 7.

Referring now to FIG. 6, in an analogous process as described above with reference to FIGS. 2-3, a temporal signal pattern of evidence for individual/touchpoint association pairs is constructed using the same inputs (block 10) as with that previous process. As the roles of the individual/ household and touchpoint instance have been reversed, the collected information is first aggregated by the individual and then sub-aggregated by touchpoint instance in each of the initially aggregated individuals' groups. This aggregation of the data once again allows for a two-dimensional view of the temporal behavior of these associations both at a specific pair level and at an individual level.

The processing of this reverse system on a distributed file system computing environment (block 16) once again occurs in steps as described following. Identifying a defensible current touchpoint instance for an individual/household (block 40) combines the input data and aggregates the information at an individual/household. This information is then used to pick the best (most active) touchpoint instance for an individual (CL)/household (HHL). Both the context from the data used in the decisions as well as the decisions themselves are generated. This process will be described in further detail by use of FIG. 7. The final decisions file from block 40 will be used to generate a cross reference file at block 42 with associations from a touchpoint instance to a CL/HHL in order to be integrated into the EGRR build. The results from block 42 are then integrated into the EGRE (match service) to be used as a part of delivery bundles at block 44 for a client's consumption.

Block 40 (i.e., the component that computes the association of the most defensible and active touchpoint instance to its respective individual/household from FIG. 6) is now described in detail using FIG. 7. As noted in the description of FIG. 6, all the processing in FIG. 7 is performed using a Hadoop computing environment 16. The input stream (block 10) in FIG. 7 is the same as described above in FIG. 6. A set of raw data source files (block 12 as described above) will be read into the system along with the web-address/domain classification (block 24 as described above) to create a temporal signal pattern for this data. First these raw data sources are sent through the same standard file hygiene subsystem and have a CL and HHL appended as described in FIG. 3 at block 27. Next the system overlays the industry flag from the web address classification file and aggregates the data on the individuals/households to create a temporal pattern signal for the source data at block 46. As a part of this temporal signal pattern, each identified touchpoint instance/ individual/household association within each record instance is recorded with the pertinent data source information (as described in FIG. 3) at block 46 of FIG. 7. The usage history of each of the touchpoint instance/individual/household associations is shown at block 48 of FIG. 7. As noted in the description of FIG. 3, on access to a particular entity representation in the EGRR, its internal metadata captures and aggregates data over a long-term for a fixed time period. This aggregated data is used to infer possible changes in the behavior of the entities they represent. This method helps us get a historical view of possible touchpoint instance association changes that cannot be simulated with current third-party source data. As noted in the description of FIG. 3, the inventors hereof have recognized that this broad and anonymized coverage could be leveraged to construct representative touchpoint instance associations for every consumer link in the EGRR that directly addresses all of the issues noted earlier. This aggregated metadata as noted above is used to form temporal signal pattern which can directly identify and validate changes in PII information at a very granular level. The EGRR offers several such temporal views for each touchpoint instance relative to their identified individual/household associations and attribute data extending over many years. The collection and aggregation of such information is used to construct a temporal pattern signal from internal metadata shown in block 48.

As stated above, all the touchpoint and individual/household associations will be considered as a potential best touchpoint instance for a particular individual/household association. Block 50 bridges the gap between the association coverage provided through the raw data sources as well as the internal metadata and all the historical associations from EGRR. These two types of associations are collected and aggregated at an individual/household to provide a single point of view for all the individual/household and touchpoint instance associations. This component will consist of attributes like source contribution count and last provided date from the EGRR.

The files from all the three components (block 46, 48, and 50) above are then combined to create a temporal signal pattern providing a holistic view of all the possible touchpoint instances for a given individual/household and its respective association attributes collected above at block 34. The resultant file is created with all the respective data attributes for each touchpoint instance/individual/household association pair and output at block 52. FIG. 8A provides an example of the resultant file for the case of individuals (note that the table is broken into two sections for clarity, but corresponding rows in the two sections pertain to the same resultant file as was done in the earlier example). A very similar separate resultant file as shown in FIG. 8B would be generated for households.

As noted in the reverse process description above, this resultant file above is very contextually rich and is in a linearized, semi-structured format from which a best touchpoint instance individual (CL) or household (HHL) for a given individual (CL) or household (HHL) can be defensibly identified at block 52 of FIG. 7. As in the previous system, not only is this single touchpoint instance identified, but all touchpoint instances for every touchpoint type that have some degree of meaningful evidence to support an association with the given touchpoint instance is ranked. As in the previous system, this ranking is determined in terms of the strength and defensibility of the given evidence and associated context. Once again, the strength of each candidate association is measured by two dimensions, namely, the quantity of evidence and the types of context that provide the association. The quantity is measured by the number of distinct sources that provide the given association.

The ranking process of this system is very similar to the process described in the previous system, using the same criteria described in the previous system. However, there is one significant difference between the two systems. In the previous system when choosing a best individual/household for a touchpoint instance, each candidate individual/household is considered to be of equal believability before looking at the temporal evidence to pick a "best". For this case, the system must pick a best touchpoint instance, and some touchpoint instances can be questionable regardless of the actual temporal data. For example, a clearly "fake" phone number like "000-000-0000", a clearly salacious email instance, or an email instance whose domain is from a provider of short-lived email addresses will not be returned as a "best" instance. Such instances can be included in the "poor" category (as already discussed in the previous system). For example, using the first individual (CL 123 from the column named "CL") in the table of FIG. 8A, the three email instances (column names "Touchpoint Type') "john.doe@yahoo.com," "john.doe@yahoo.com," and "john.doe@yahoo.com" (column names Touchpoint") are returned. Considering the information in the column named "URL" the first email instance was provided by both a financial institution as well as a retail site whereas the other two instances were provided by less reliable sites (a survey site and social site). Likewise, the first email instance contains one of the two names associated with the individual, namely "John Doe" (column named "Name"). Considering the two temporal signals in the column named "Temporal Signal Pattern" all three email instances have meaningful usage signals the first email instance has the strongest signal, the second has the next strongest, and the last instance has the weakest. In terms of the "presence in source files" signals of zeros and ones the first email instance has been seen the most recent three months, the second has been seen in the most recent two months and six months ago, and the third was only seen six months ago. In terms of the ranking these email instances, the first and second email in the example are placed in the "good" category based on the information above, whereas the third is placed in the "moderate" category due to the lower temporal counts, the contribution by only a survey site, and the lack of any recent contribution by any raw data source file. This categorization automatically ranks this third instance lower than those in the "good" category. Considering the two in the "good" category, the information collected above indicates that the first email instance will be initially chosen as the best one for the CL 123. For the final step (the champion-challenger process), the system checks the value in the "Prev Month Best TP" column and notes that the initially chosen value is the same as the computed best value and hence this value is chosen as the final choice. It should be noted that if the previous month's choice was one of the other two email instances the difference between the initial choice and the others is dramatic and hence the first instance would beat the champion (previous month's choice).

The resultant file from this component is then processed through block 42 mentioned above in FIG. 6 to create two final output files from the system. These files are a cross-reference of CLs/HHLs with a set of ranked touchpoint instances chosen for that respective CL and/or HHL as shown in FIG. 9, i.e. CLs (in column CL) and HHLs (in column HHL) with its respective picked set of touchpoint instances (in column "Best Touchpoint for Individual" and/or "Best Touchpoint for Household"; multiple touchpoint instances separated by a pipe). It will be seen that where a CL and/or HHL is resolved to multiple touchpoint instances, those instances are returned with a rank relative to the other touchpoint instances (in column "Touchpoint Ranking"; when we have multiple touchpoint instances for a CL and/or HHL, each respective touchpoint instance rank is separated by a pipe) to which the CL and/or HHL was resolved. Again, this may correspond to multiple touchpoint instances used the same CL and/or HHL, but the ranking process allows for the determination of a "best" touchpoint instance associated with the given individual or household. Also, as noted above ranking of touchpoints may be specific to a particular industry or use depending upon the application.

Figure 10:
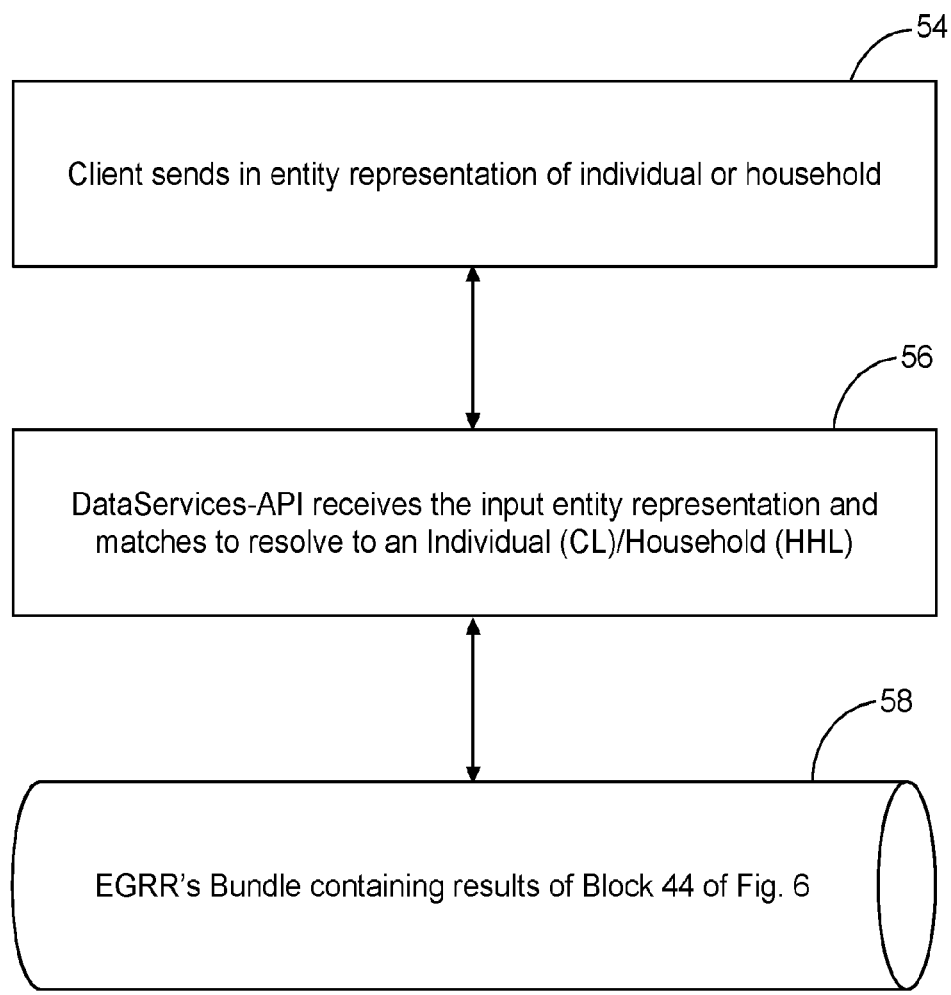
FIG. 10 is a flowchart for the communication between clients and the Entity Graph Resolution Engine (EGRE) for delivery of a best touchpoint instance according to an implementation of the invention.
Figure 11:
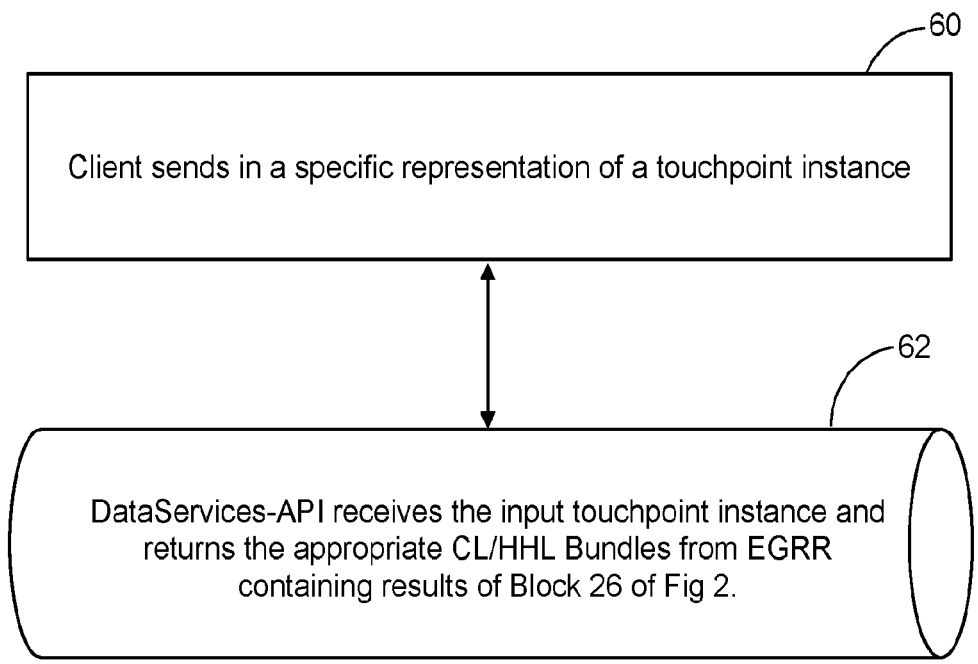
FIG. 11 is a flowchart for the communication between clients and the EGRE for delivery of a best consumer link/household link according to an implementation of the invention.

Referring now to FIG. 10, the cross-reference files from the best touchpoint instance for a CL/HHL system described above are used to determine the desired best touchpoint instance for an individual/household from a client's input. In the case that a client wishes to find the best touchpoint instance for any touchpoint type for an individual, the client will input an appropriate entity representation for the individual or household at block 54. By use of the matching logic from EGRE the unique link (CL or HHL) will be retrieved from the EGRR at block 56 and the appropriate best touchpoint instance from the output of block 44 of FIG. 6 will be returned (this data is keyed on such links, i.e., CL/HHL) at block 58. Similarly, referring to FIG. 11, the cross-reference files from the best CL/HHL for a touchpoint Instance system described above are used to determine desired best CL/HHL for a given touchpoint instance from a client's input. If a client wishes to find the best CL/HHL for a given touchpoint instance, the client will input that touchpoint instance at block 60. The results from the EGRE at block 62 include the output of block 26 of FIG. 2, returned with appropriate EGRR's attribute bundles.

One implementation of this system resides on a distributed Hadoop cluster containing over 300 node computers/processors. An application programming interface (API) may be used to receive input from a client device, such as a laptop or desktop computer. Likewise, an output module provides a means of outputting the resulting data to the client device. As previously noted, the distributed file system computing environment is particularly well-suited to the implementation of the invention because of key features that simplify operations in large data environments, but other implementations are possible. Also, the size of the distributed cluster is not an important requirement for an implementation of this system, but the overall efficiency of this system will improve dramatically as the number of nodes increases. As referenced in FIG. 12, the computing environment, in one particular implementation, allows for the ingestion of over 28 terabytes of input data. This data includes multiple months of internal metadata, multiple entity representations, and touchpoint reference tables extracts from the EGRR. Also included are multiple data provider source files. This collection of data creates the contextually rich hints files that are used in the actual decision making and archiving both the final decisions and the context from which each decision was made. The resulting contextual hints files have a memory footprint of only 175 gigabytes, which is less than 1% (in one implementation, only 0.63%) the footprint of the data that must be consumed and interpreted to create these hints files. This is accomplished by creating semi-structured data that is keyed on the individual, household and touchpoint instance as seen in the table of FIG. 4, FIG. 8A, and FIG. 8B, respectively. These hints files are the output from the temporal signal pattern created as shown in FIGS. 3 and 7. These representations preserve the rich contextual framework computed while greatly reducing the data footprint of this implementation as previously described with reference to FIGS. 3 and 7.

These output contextual hints files can be easily stored on a client device such as a single laptop computer for use in customer support of the results of each of the described touchpoint association systems, even though back-end processing is using a multi-node cluster. Doing so detaches the support service environment from the computing environment. This approach offers advantages in data security, because the bulk of the data is stored behind a firewall through which the client device accesses the output data. Cost savings and efficiencies are created because any number of client devices can be employed, which if laptop or desktop computers are used will be inexpensive to purchase and maintain. Also, the identification of all or part of the evidence to support the final result (rankings) can be looked up in only a matter of seconds. The identification of all the candidates for the choice of the best individual/household for a touchpoint instance as well the best touchpoint instance for a given individual/household is done in a very efficient yet accurate manner. Similarly, the eventual ranking of these candidates is also generated with the same degree of efficiency and accuracy.

This distributed system allows for the efficient ability to process extremely large volumes of raw data in a parallel rather than a purely sequential fashion. The nature of the particular problem to be solved lends itself to parallel processing in a distributed node environment, and thus the invention is directed to a distributed node cluster for purposes of making the process feasible by allowing execution in a timeframe that is practical in a real-world business environment. For example, suppose three large files need to be ingested and each can be processed independent of the other. If each requires two hours of processing, a sequential system will require more than six hours to process all the data whereas the distributed system will take only two hours as each file is processed in parallel and there is no lost time in moving from one file to another. Furthermore, the distributed system can easily use a cascade of independent steps for a given algorithm that can store intermediate results to disk rather than keeping them in memory. As disk space greatly exceeds memory space, the system can be used to implement a computationally and memory intensive exact algorithm without requiring that it be altered to create a heuristic (somewhat approximate alternative) algorithm to be capable of being successfully run on a typical serial, single-node system. Hence there is no degradation of the quality of the system's results using this system and method.

The computing environment prescribed in this system and method allows for extremely efficient computing (in terms of run time) for the ingestion of the enormous amount of needed data and subsequent decision-making process. In FIG. 13, there are seven different components in the construction of the data for the system shown with reference to runtime. The column named "Storage Size" identifies the storage for the input for each of these components. Note that this implementation uses a total of 17.5 terabytes of input data storage. If these components were run in sequence on a single processor, the time needed to complete each of these task is found in the column named "Duration Using Sequential Processing" (a total of 14 hours). However, one implementation of this system uses parallel computing on a distributed network as noted above, and the times for each of the steps is found in the column named "Duration Using Parallel Processing" (a total of 3.5 hours, i.e., in 25% of the time).

This system helps clients with their marketing prospects. If a client knows an individual/household, they can seek for a set of best digital touchpoints to reach/target that individual/household based on their use case. Also, if they have a digital touchpoint, they can seek for a set of best individuals/households that can be targeted or reached using that digital touchpoint though which they can understand their marketable audience very well. This system therefore allows clients of the service provider to better identify, segment, target and market to their prospective customers (individuals or households). Specifically, benefits that may be achieved include: a client can derive a much better understanding of their target prospective audience; a client could improve the accuracy and reach of its prospective consumers; a client could expect to have an effective ability to replace one touchpoint with another, yet, still preserving existing quality reach of its audience; and a client will be able to identify effective digital means to reach its marketable audience. Because of the greatly reduced processing times as illustrated by the example set forth above and in FIG. 13, the system allows decision-making processes to occur in timeframes that are practical in the business world. The fact that the underlying data is constantly changing due to updates coming in from the various outside data sources means that slower processing times would result in output that is already out of date by the time it is generated. Simple sequential processing could result, on the other hand, in output that no longer has business relevance by the time it is generated.

In today's fast-changing digital world, it is possible for an individual (CL) or household (HHL) to be associated with more than one digital touchpoint type with multiple touchpoints per each touchpoint type. For a client to expand its reach and accuracy from a digital marketing perspective, it is important for that client to identify the individual that could be associated with a touchpoint instance, and the best touchpoint instance to reach that CL or HHL. Also in some cases the client will be interested in knowing the best touchpoint type and touchpoint instance associated with that touchpoint type that they could use to increase the probability of targeting and reaching the correct end consumer. The system thus helps clients expand its reach and accuracy in their digital marketing. This system and method has demonstrated dramatic increases in the computing environment efficiencies and is further anticipated to provide high value to clients by virtue of increased focus and accuracy on the clients' digital marketing campaigns. The system's focus on accuracy, recency and temporal stability provides a rich single point of view of digital touchpoints.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A node cluster architecture for a touchpoint to consumer/households resolution system, comprising:
   a. an entity graph resolution repository (EGRR) comprising a plurality of representation data structures, wherein each representation data structure comprises:
      i. at least one datum concerning an individual or a household;
      ii. at least one touchpoint associated with such individual or household; and
      iii. at least one consumer link (CL) or household link (HHL);
   b. an entity graph resolution engine (EGRE) hosted across the node cluster architecture and in communication with the EGRR, wherein the EGRE is configured to receive a plurality of input identifiers each for an individual or a household and utilize the EGRR to resolve such identifiers in parallel across a plurality of nodes in the node cluster architecture;
   c. a temporal signal file populated by the EGRE and comprising pairings between touchpoints and individuals or households; and
   d. a cross-reference file created by the EGRE from the temporal signal file and comprising a ranking of CLs or HHLs for a touchpoint or a ranking of touchpoints for a CL or HHL,
   wherein the EGRE further comprising an application programming interface (API) to receive a request, wherein the request comprises either one or more CLs or HHLs or one or more touchpoints,
   and further wherein the EGRE comprises an output module configured to return from the cross-reference file one or more touchpoints in response to receiving a CL or HHL, or to return one or more CLs or HHLs in response to receiving a touchpoint.

2. The node cluster architecture of claim 1, wherein each digital touchpoint comprises a telephone number, an email address, a mobile advertiser identifier (MAID), a social network handle, or a gaming handle.

3. The node cluster architecture of claim 1, wherein the EGRR comprises a plurality of data sources, the data sources comprising a plurality of raw data source files.

4. The node cluster architecture of claim 3, wherein the EGRR data sources further comprise touchpoint associations history.

5. The node cluster architecture of claim 4, wherein the EGRR data sources further comprise raw source usage statistics from internal metadata.

6. The node cluster architecture of claim 5, wherein the EGRR data sources further comprise web address/domain classifications.

7. The node cluster architecture of claim 3, wherein the EGRE is further configured to process the raw data source files through file hygiene, overlay a URL classification flag, and append CLs or HHLs from the EGRR to the raw data source files.

8. The node cluster architecture of claim 7, wherein the EGRE is further configured to create a temporal signal including a URL industry/type classification flag.

9. The node cluster architecture of claim 8, wherein the EGRE is further configured to create a temporal signal for the data coming from usage statistics.

10. The node cluster architecture of claim 9, wherein the EGRE is further configured to pull in attribute data for CL or HHL and touchpoint combinations.

11. The node cluster architecture of claim 10, wherein the EGRE is further configured to combine temporal signals and attribute data.

12. The node cluster architecture of claim 1, further comprising a client device and a network connecting the EGRE to the client device, wherein the client device is configured to interact with the API to send a request, wherein the request comprises either one or more CLs or HHLs or one or more touchpoints, and further wherein the client device is configured to receive back from the EGRE one or more touchpoints in response to sending a CL or HHL, or one or more CLs or HHLs in response to sending a touchpoint.

13. A method for determining a best individual or household for a particular touchpoint in a distributed node architecture, the method comprising the steps of:
   a. constructing an entity graph resolution repository (EGRR) comprising a plurality of representation data structures, wherein each representation data structure comprises:
      i. at least one datum concerning an individual or a household;
      ii. at least one touchpoint representation associated with such individual or household; and
      iii. at least one consumer link (CL) or household link (HHL) associated with an individual or a household, respectively;
   b. engaging an entity graph resolution engine (EGRE) to resolve from each touchpoint representation a most defensible individual or household for each touchpoint representation, wherein the evaluation of each potential individual or household is distributed across a plurality of nodes of the distributed node architecture;
   c. constructing a temporal signal file populated by the EGRE and comprising pairings between touchpoint representations and individuals or households; and
   d. constructing a cross-reference file from the temporal signal file, wherein the cross-reference file comprising a ranking of, for each touchpoint representation, a CL, an HHL, or both a CL and an HHL.

14. The method of claim 13, further comprising the step of receiving at an application programming interface (API) at the EGRE a request from a client device, wherein the request comprises one or more touchpoint representations.

15. The method of claim 14, further comprising the step of, at an EGRE output module, returning to the client device from the cross-reference file one or more CLs, HHLs, or both CLs and HHLs.

16. The method of claim 13, wherein the step of engaging the EGRE to resolve from each touchpoint representation a most defensible individual or household for each touchpoint representation further comprises the step of processing raw data source files through file hygiene, overlaying a URL classification flag, and appending CLs or HHLs to the raw data source files.

17. The method of claim 16, wherein the step of engaging the EGRE to resolve from each touchpoint representation a most defensible individual or household for each touchpoint representation further comprises the step of creating a temporal signal including a URL industry/type classification flag.

18. The method of claim 17, wherein the step of engaging the EGRE to resolve from each touchpoint representation a most defensible individual or household for each touchpoint representation further comprises the step of creating a temporal signal for a set of data coming from usage statistics.

19. The method of claim 18, wherein the step of engaging the EGRE to resolve from each touchpoint representation a most defensible individual or household for each touchpoint representation further comprises the step of pulling in attribute data for touchpoint and CL or HHL combinations.

20. The method of claim 19, wherein the step of engaging the EGRE to resolve from each touchpoint representation a most defensible individual or household for each touchpoint representation further comprises the step of combining temporal signals and attribute data.

21. A method for determining a best touchpoint for a particular individual or household in a distributed node architecture, the method comprising the steps of:
   a. constructing an entity graph resolution repository (EGRR) comprising a plurality of representation data structures, wherein each representation data structure comprises:
      i. at least one datum concerning an individual or a household;
      ii. at least one touchpoint representation associated with such individual or household; and
      iii. at least one consumer link (CL) or household link (HHL) associated with an individual or a household, respectively;
   b. engaging an entity graph resolution engine (EGRE) to resolve from each individual or household a most defensible touchpoint representation for each individual or household, wherein the evaluation of each potential touchpoint representation is distributed across a plurality of nodes of the distributed node architecture;
   c. constructing a temporal signal file populated by the EGRE and comprising pairings between individuals or households and touchpoint representations; and
   d. constructing a cross-reference file from the temporal signal file, wherein the cross-reference file comprising a ranking of, for each individual or household, a touchpoint representation and a CL, an HHL, or both a CL and an HHL.

22. The method of claim 21, further comprising the step of receiving at an application programming interface (API) at the EGRE a request from a client device, wherein the request comprises one or more individuals or households.

23. The method of claim 22, further comprising the step of, at an EGRE output module, returning to the client device from the cross-reference file one or more CLs, HHLs, or both CLs and HHLs.

24. The method of claim 21, wherein the step of engaging the EGRE to resolve from each individual or household a most defensible touchpoint representation for each individual or household further comprises the step of processing raw data source files through file hygiene, overlaying a URL classification flag, and appending CLs or HHLs to the raw data source files.

25. The method of claim 24, wherein the step of engaging the EGRE to resolve from each individual or household a most defensible touchpoint representation for each individual or household further comprises the step of creating a temporal signal including a URL industry/type classification flag.

26. The method of claim 25, wherein the step of engaging the EGRE to resolve from each individual or household a most defensible touchpoint representation for each individual or household further comprises the step of creating a temporal signal for a set of data coming from usage statistics.

27. The method of claim 26, wherein the step of engaging the EGRE to resolve from each individual or household a most defensible touchpoint representation for each individual or household further comprises the step of pulling in attribute data for touchpoint and CL or HHL combinations.

28. The method of claim 27, wherein the step of engaging the EGRE to resolve from each individual or household a most defensible touchpoint representation for each individual or household further comprises the step of combining temporal signals and attribute data.

\* \* \* \* \*